LESLIE & RICHARDSON.
Hold-Back.
No. 39,736.                                      Patented Sept. 1. 1863
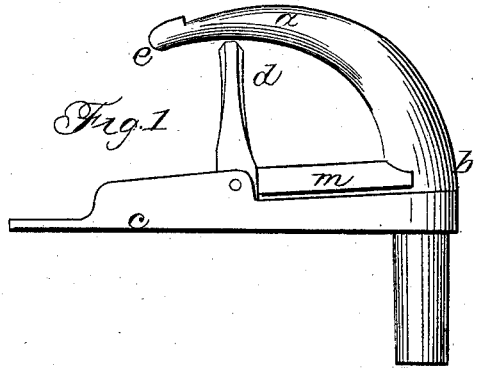
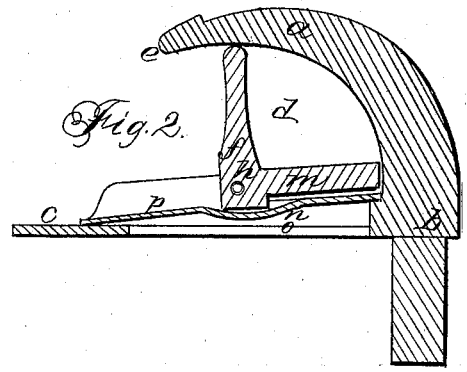
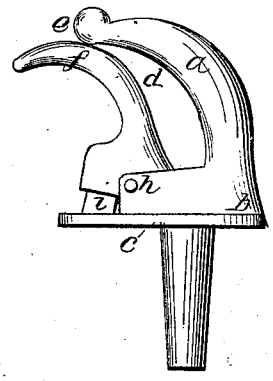
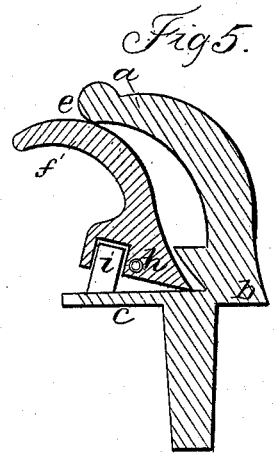
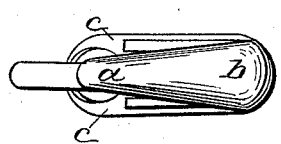
Witnesses.
James Bennett
D Ann Bennett
Inventors
LeRoy N Leslie
Thurston Richardson

UNITED STATES PATENT OFFICE.

LA ROY N. LESLIE AND THURSTON RICHARDSON, OF LEOMINSTER, MASS.

IMPROVEMENT IN ATTACHING BREECHING TO THILLS OF VEHICLES.

Specification forming part of Letters Patent No. 39,736, dated September 1, 1863; antedated November 19, 1862.

*To all whom it may concern:*

Be it known that we, LA ROY N. LESLIE and THURSTON RICHARDSON, both of Leominster, in the county of Worcester and State of Massachusetts, have invented certain new and useful Improvements in Breeching-Hooks Attached to the Shafts of Vehicles; and we do hereby declare that the following description, taken in connection with the accompanying drawings, hereinafter referred to, forms a full and exact specification of the same, wherein we have set forth the nature and principles of our said improvements, by which our invention may be distinguished from all others of a similar class, together with such parts as we claim and desire to have secured to us by Letters Patent.

The figures of the accompanying plate of drawings represent our improvements.

Figures 1 and 4 are side views of our improved breeching-hook. Figs. 2 and 5 are central longitudinal vertical sections of the same, and Figs. 3 and 6 top or plan views.

The present invention relates to certain new and useful improvements in the construction of breeching-hooks for the thills of vehicles, the object of which is to allow the breeching-straps of the harness to readily disengage themselves therefrom, the traces, however, first having become unhitched from breakage or otherwise, thereby, as the horse moves forward, setting him entirely free from the thills and the vehicle, the many advantages of which are evident, and therefore need not be herein particularly enumerated.

We accomplish the above-desired result by placing within, and thereby closing, as it were, the opening of the breeching-hook, a vertical lever-arm turning at its lower end upon a fulcrum of the shaft or thill. This lever, when the breeching-strap is to be inserted within the hook, is turned upon its fulcrum a sufficient distance to admit of the same, and then, from the force of any suitable spring attached thereto, closes again its opening, and forming thus a barrier to the escape of the strap from the hook as the vehicle is drawn; but the instant, however, that the traces become unhitched, broken, or otherwise disconnected from their whiffletree, the horse then, by his forward movement in the thills, causes the breeching-strap to pull or bear upon the swinging lever of the hook, turning the same thereby a sufficient distance to allow the strap to slide out from its hooks, and thus set the horse free from the carriage, as desired.

$a\ a$ in the accompanying drawings represent the bent portion of a hook, secured at the end $b$ to or forming a part thereof, the plate $c$, which plate is attached by screws or in any suitable manner to the upper side of the thills of vehicles in the proper position, and with the opening $d$ of the hook toward the outer end of the shaft. Between the bent portion $a$, at the end $e$ thereof, and the plate $c$ in and across the said mouth or opening $d$, a vertical swinging lever-arm, $f$, is placed, having a fulcrum at $h$ of the plate $c$. $i$ is a rubber or any other suitable spring attached to the lever $f$, that serves to retain and force the same always back to its original and vertical position in the opening $d$.

To insert the breeching-strap in the hook $a$ the lever $f$ is turned upon its fulcrum, thus opening the mouth $d$ a sufficient distance to admit of the same, when the lever then closes and retains the strap within its hook until the strap, in consequence of the breakage or unhitching of the traces, and as the horse moves forward in the thills pulls or bears against its inside edge or surface in such a manner as to turn the lever again upon its fulcrum, opening the mouth of the hook, whereby the strap is allowed to slide out from the same, thus setting the horse free from the shafts, as desired.

In the above description the figures of the drawings particularly referred to are 4, 5, and 6; but in the remaining figures a modification of our improvements, but involving the same principle, is represented, the essential difference between the two consisting in attaching to (or forming a part thereof) the vertical lever $f$ a horizontal right-angular arm, $m$, the one, $m$, serving, when the breeching-strap is within the hook, as a cover to the spring $n$ to protect it from moisture, and, as the lever $f$ turns upon its fulcrum, also to push the strap out of the hook through its opening or mouth, as is evident without further description.

It is evident that there are various ways of arranging and placing a vertical lever within and at the opening of breeching-hooks, and therefore we do not intend to limit ourselves in our claims to the particular mode herein described, the essential feature and principle of the present invention being to so place and arrange at or in the mouth or opening of the breeching-hook a lever susceptible of being turned in such a manner as to open and close the opening to and upon the insertion in and removal from the hook of the breeching-strap, and also to allow of the self-disengagement of the breeching from their hooks when the traces are unhitched or broken, for the purpose of setting the horse free of the vehicle.

The advantage of the method represented in Figs. 1, 2, and 3 over that represented in the remaining figures, and described in the first part of the specification, is that the strap can be more easily slipped into its hook, and it is not necessary that it should be especially adjusted therewith.

Having thus described our improvements, we shall state our claims as follows:

What we claim as our invention, and desire to have secured to us by Letters Patent, is—

1. Constructing a breeching hook with a spring-lever placed in or at its opening and turning upon a pivot or fulcrum, so as to operate substantially as hereinabove described.

2. Constructing the spring-lever with right-angular arms, working close or nearly close up to the bow of the breeching-hook, substantially as described, and for the purposes specified.

LA ROY N. LESLIE.
THURSTON RICHARDSON.

Witnesses:
JAMES BENNETT,
D. ANN BENNETT.